US012448842B2

(12) United States Patent
Zhu et al.

(10) Patent No.: US 12,448,842 B2
(45) Date of Patent: Oct. 21, 2025

(54) TWO-STEP STEP STOOL

(71) Applicant: Jiangsu Zhou Jijie Intelligent Technology Co., Ltd, Suqian (CN)

(72) Inventors: Xuelin Zhu, Suqian (CN); Baisong Yao, Suqian (CN); Weiqiang Liu, Suqian (CN)

(73) Assignee: JIANGSU ZHOU JIJIE INTELLIGENT TECHNOLOGY CO., LTD, Suqian (CN)

( * ) Notice: Subject to any disclaimer, the term of this patent is extended or adjusted under 35 U.S.C. 154(b) by 844 days.

(21) Appl. No.: 17/732,573

(22) Filed: Apr. 29, 2022

(65) Prior Publication Data

US 2022/0349254 A1 Nov. 3, 2022

(30) Foreign Application Priority Data

Apr. 30, 2021 (CN) ......................... 202120939190.9

(51) Int. Cl.
*E06C 1/383* (2006.01)
*A47C 12/00* (2006.01)

(52) U.S. Cl.
CPC ............ *E06C 1/3835* (2013.01); *A47C 12/00* (2013.01)

(58) Field of Classification Search
CPC ....... A47C 12/00; A47C 12/02; E06C 1/3835; E06C 1/005; E06C 7/16; E06C 1/383
See application file for complete search history.

(56) References Cited

U.S. PATENT DOCUMENTS

| | | | | |
|---|---|---|---|---|
| 6,926,119 B1 * | 8/2005 | Schrock | E06C 1/393 182/152 |
| D756,574 S * | 5/2016 | Jakubowski | D30/199 |
| 9,832,968 B2 * | 12/2017 | Jakubowski | A01K 1/035 |
| 10,995,548 B2 * | 5/2021 | Cornthwaite | E06C 1/16 |
| 2011/0114419 A1 * | 5/2011 | Merey | E06C 1/383 182/152 |
| 2016/0060957 A1 * | 3/2016 | Onobrakpeya | E06C 1/26 182/106 |
| 2022/0098928 A1 * | 3/2022 | Zaifman | A47C 12/02 |

* cited by examiner

*Primary Examiner* — David E Martinez
(74) *Attorney, Agent, or Firm* — Bayramoglu Law Offices LLC

(57) ABSTRACT

A two-step step stool includes a primary stool and a secondary stool. The primary stool includes a primary supporting plate and a primary pedal hinged with a top of the primary supporting plate. The secondary stool includes a secondary supporting plate and a secondary pedal hinged with a top of the secondary supporting plate. The secondary pedal is higher than the primary pedal. A middle plate is arranged between the primary stool and the secondary stool and is respectively hinged with the primary pedal and the secondary pedal. A linkage mechanism capable of folding the primary stool and the secondary stool synchronously is further arranged between the primary stool and the secondary stool. The two-step step stool can be drawn close towards the middle plate when being folded by hinging the primary pedal with the middle plate and hinging the secondary pedal with the middle plate.

13 Claims, 5 Drawing Sheets

TWO-STEP STEP STOOL

CROSS REFERENCE TO THE RELATED APPLICATIONS

This application is based upon and claims priority to Chinese Patent Application No. 202120939190.9, filed on Apr. 30, 2021, the entire contents of which are incorporated herein by reference.

TECHNICAL FIELD

The present invention belongs to the technical field of step stools, and particularly relates to a two-step step stool.

BACKGROUND

Due to one-time injection molding, conventional two-step step stools cannot be folded and unfolded, so that the two-step step stools feature large packaging size, high transportation cost and troublesome movement and transfer.

Existing foldable two-step step stools generally include two types: a two-step step stool folded in the middle, with poor structural stability, and a two-step step stool connected in full hinge, which is easy to swing and poor in stability. Furthermore, the existing two-step step stools are narrow in stool surface and poor in comfort level.

SUMMARY

The objective of the present invention is to provide a two-step step stool with high stability to solve the problems in the prior art.

The objective of the present invention can be achieved by the following technical scheme: the two-step step stool includes a primary stool and a secondary stool, wherein the primary stool includes a primary supporting plate and a primary pedal hinged with a top of the primary supporting plate; the secondary stool includes a secondary supporting plate and a secondary pedal hinged with a top of the secondary supporting plate; the secondary pedal is higher than the primary pedal; a middle plate is arranged between the primary stool and the secondary stool and is respectively hinged with the primary pedal and the secondary pedal; and a linkage mechanism capable of folding the primary stool and the secondary stool synchronously is further arranged between the primary stool and the secondary stool.

A user steps on the primary pedal and the secondary pedal, the primary supporting plate and the secondary supporting plate are used for supporting, and the middle plate not only plays a role of supporting, but also plays a role of connecting the primary supporting plate and the secondary supporting plate. The two-step step stool can be folded by hinging the primary supporting plate with the primary pedal and hinging the secondary supporting plate with the secondary pedal, and can be drawn close towards the middle plate when being folded by hinging the primary pedal with the middle plate and hinging the secondary pedal with the middle plate, so that the occupied area is decreased greatly and it is convenient to convey or move and transfer the two-step step stool. The linkage mechanism is arranged to drive the primary stool and the secondary stool to be folded synchronously, the two-step step stool is easily operated and conveniently used, is high in stability and can be provided with a wider stool surface.

In the above-mentioned two-step step stool, the linkage mechanism further can enable the primary stool and the secondary stool to be unfolded synchronously.

In the above-mentioned two-step step stool, the linkage mechanism includes a first connecting rod arranged between the primary supporting plate and the middle plate and a second connecting rod arranged between the secondary supporting plate and the middle plate, the first connecting rod and the second connecting rod being linked.

The first connecting rod and the second connecting rod are folded with each other to draw close to drive the primary supporting plate and the secondary supporting plate to be folded and drawn close toward the middle plate. The primary supporting plate and the secondary supporting plate are drawn close to drive the primary pedal and the secondary pedal to be drawn close till the primary stool and the secondary stool are drawn close. The first connecting rod and the second connecting rod are unfolded to drive the primary supporting plate and the secondary supporting plate to extend and distract. The primary supporting plate and the secondary supporting plate extend to drive the primary pedal and the secondary pedal to extend till the primary stool and the secondary stool extend and distract.

In the above-mentioned two-step step stool, the first connecting rod and the second connecting rod are hinged with each other, and a hinge shaft of the first connecting rod and the second connecting rod is arranged in a chute formed in the middle plate. By arranging the hinge shaft in the chute, the hinge shaft can slide in the chute.

In the above-mentioned two-step step stool, a third connecting rod and a fourth connecting rod that are hinged with each other are further arranged between the first connecting rod and the second connecting rod, and the third connecting rod and the fourth connecting rod enable the first connecting rod to act so as to synchronously drive the second connecting rod to act.

In the above-mentioned two-step step stool, a bottom of the middle plate is provided with a yielding slot where the third connecting rod and the fourth connecting rod rotate to yield. By forming the yielding slot, the third connecting rod and the fourth connecting rod are prevented from interference with the middle plate in the folding or unfolding process.

In the above-mentioned two-step step stool, the first connecting rod or the second connecting rod is provided with a hand pulling portion capable of being pulled by a user. The first connecting rod or the second connecting rod is provided with the hand pulling portion which is conveniently pulled by the user.

In the above-mentioned two-step step stool, a locking mechanism is further arranged between the hinge shaft and the middle plate. The two-step step stool in the unfolded state is locked by arranging the locking mechanism, so that it can be kept stable.

In the above-mentioned two-step step stool, the locking mechanism includes a positioning hole formed in the middle plate and an elastic structure arranged on the hinge shaft to enable the hinge shaft to have a tendency of being jacked into the positioning hole all the time, the hinge shaft passing through the chute and penetrating into the positioning hole.

The hinge shaft penetrating into the positioning hole can be locked. As the hinge shaft is locked, the first connecting rod and the second connecting rod hinged with the hinge shaft cannot be folded or extend. The elastic structure can prevent the hinge shaft from being separated from the positioning hole accidentally. When it is needed to unlock, the hinge shaft can be pulled manually to overcome an elastic action of the elastic structure to be separated from the positioning hole, the hinge shaft can slide in the chute, and the first connecting rod and the second connecting rod can be unfolded or folded too as the hinge shaft slides.

In the above-mentioned two-step step stool, the elastic structure includes a positioning ring arranged on the hinge shaft and a spring arranged between the chute and the positioning ring, an outer diameter of the spring being greater than a width of the chute and smaller than an outer diameter of the positioning ring.

The positioning ring cannot only be jacked by the spring, but also can prevent the hinge shaft from passing through from the positioning hole or being separated from the chute. By arranging the spring, an end portion of the hinge shaft can be jacked into the positioning hole all the time.

In the above-mentioned two-step step stool, as another scheme, the locking mechanism includes a positioning hole formed in the middle plate and an internal thread arranged in the positioning hole, the hinge shaft is provided with an external thread matched with the internal thread, and the hinge shaft passes through the chute and is in threaded connection with the positioning hole.

The hinge shaft in direct threaded connection with the positioning hole is locked. As the hinge shaft is locked, the first connecting rod and the second connecting rod hinged with the hinge shaft cannot be folded or extend. When it is needed to unlock, the hinge shaft can be rotated to be separated from the positioning hole, the hinge shaft can slide in the chute, and the connecting rods can be unfolded or folded too as the hinge shaft slides.

In the above-mentioned two-step step stool, the hinge shaft is further provided with a rotating portion rotated by the user. By arranging the rotating portion, it is convenient for the user to unlock by rotating the hinge shaft.

In the above-mentioned two-step step stool, a bottom of the primary supporting plate and a bottom of the secondary supporting plate are respectively provided with anti-skid pads. By arranging the anti-skid pads, a friction force between the bottoms of the primary supporting plate and the secondary supporting plate is increased, so that an anti-skid purpose can be achieved.

Compared with the prior art, the two-step step stool can be folded by hinging the primary supporting plate with the primary pedal and hinging the secondary supporting plate with the secondary pedal, and can be drawn close towards the middle plate when being folded by hinging the primary pedal with the middle plate and hinging the secondary pedal with the middle plate, so that the occupied area is decreased greatly and it is convenient to convey or move and transfer the two-step step stool. The linkage mechanism is arranged to drive the primary stool and the secondary stool to be unfolded and folded, the two-step step stool is easily operated and conveniently used, is high in stability and can be provided with a wider stool surface. The yielding slot is formed to prevent the first connecting rod and the second connecting rod from interference with the middle plate in the folding or unfolding process. The two-step step stool in the unfolded state is locked by arranging the locking mechanism, so that it can be kept stable. The hinge shaft can be prevented from being separated from the positioning hole accidentally by arranging the elastic structure or directly connecting the hinge shaft with the positioning hole by threads directly.

Figure 1:
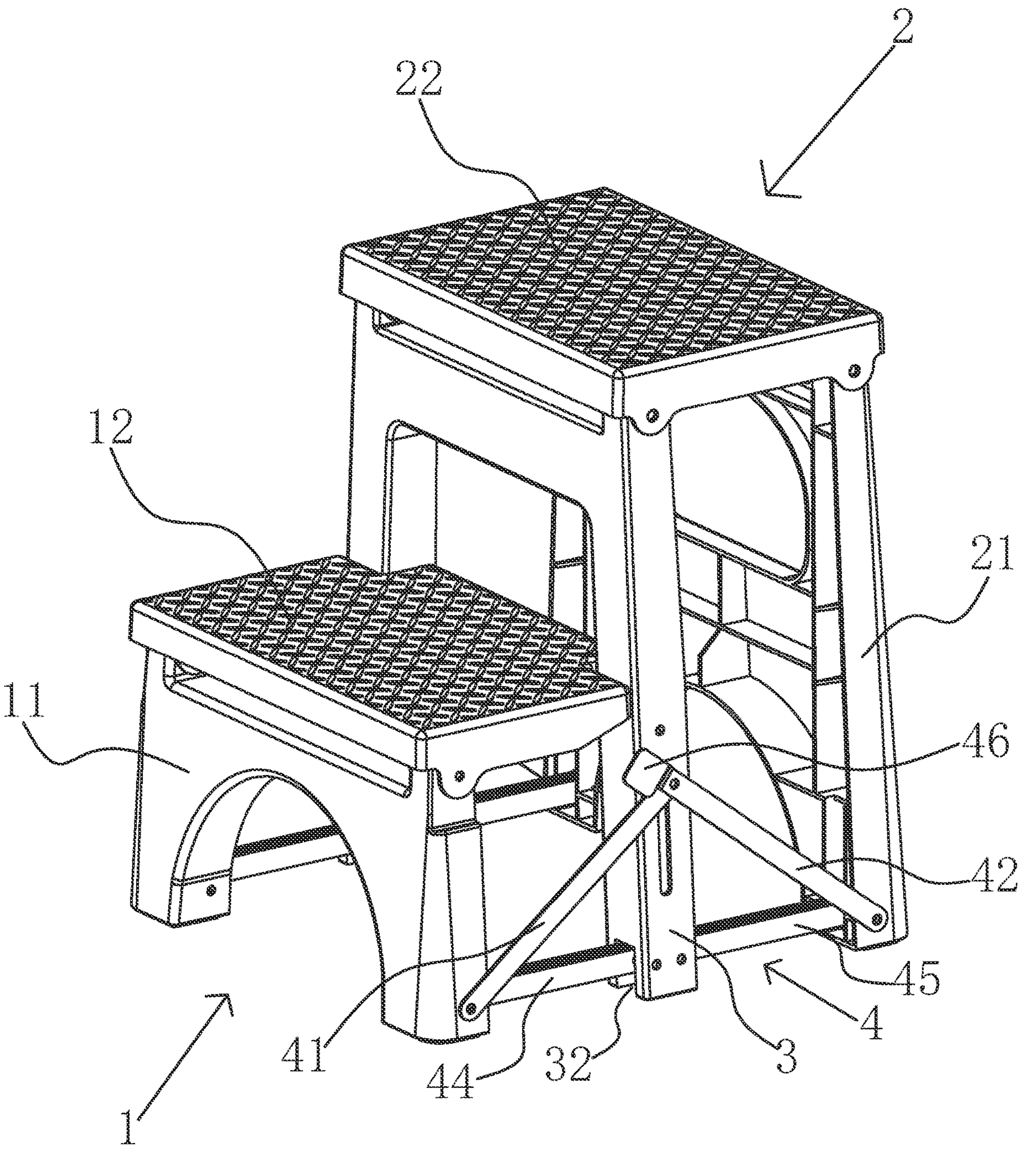
FIG. 1 is a three-dimensional structural diagram I of an embodiment 1 of the present invention in an unfolded state.
Figure 2:
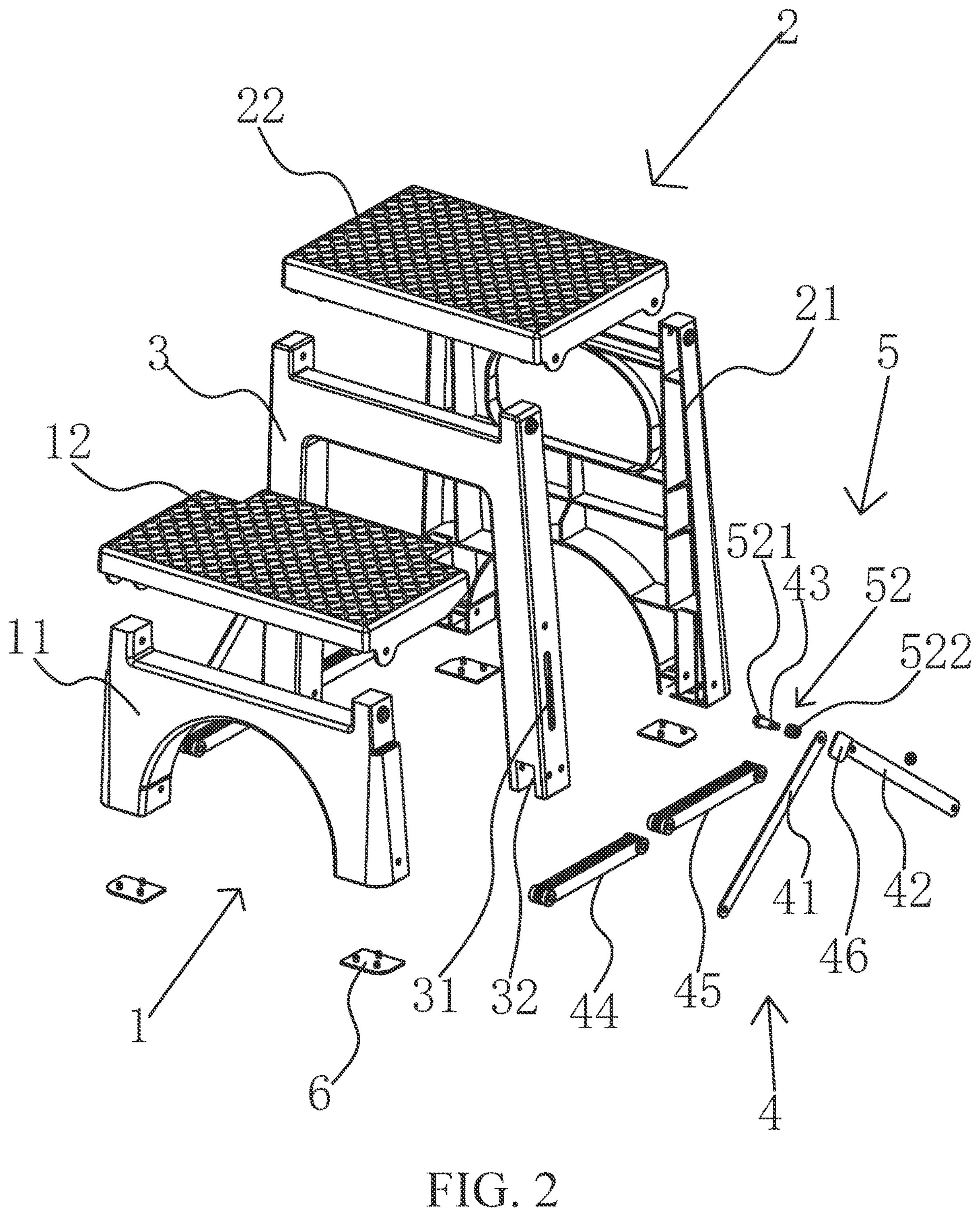
FIG. 2 is an explosive view of an embodiment 1 of the present invention.
Figure 3:
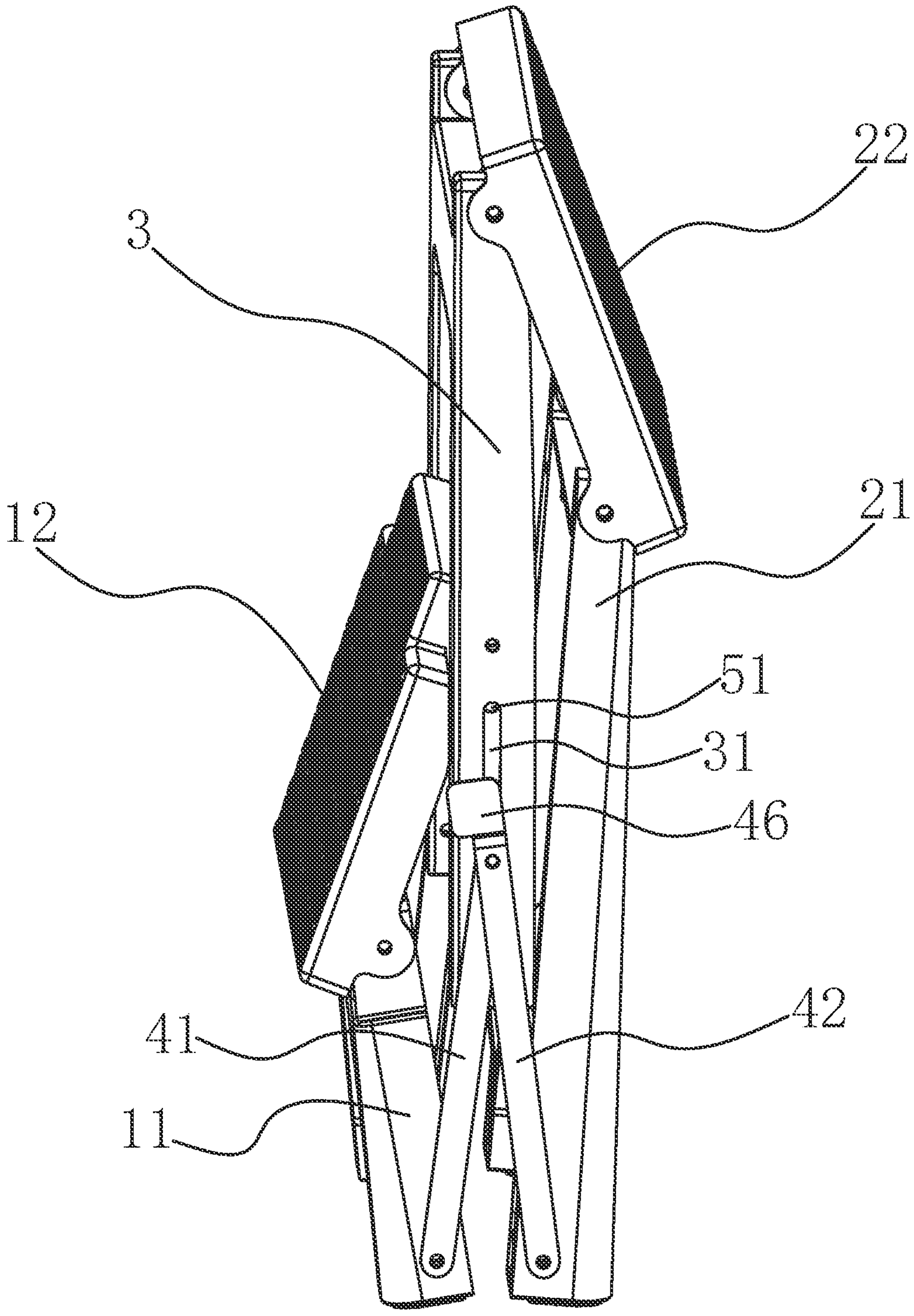
FIG. 3 is a three-dimensional structural diagram II of an embodiment 1 of the present invention in a folded state.
Figure 4:
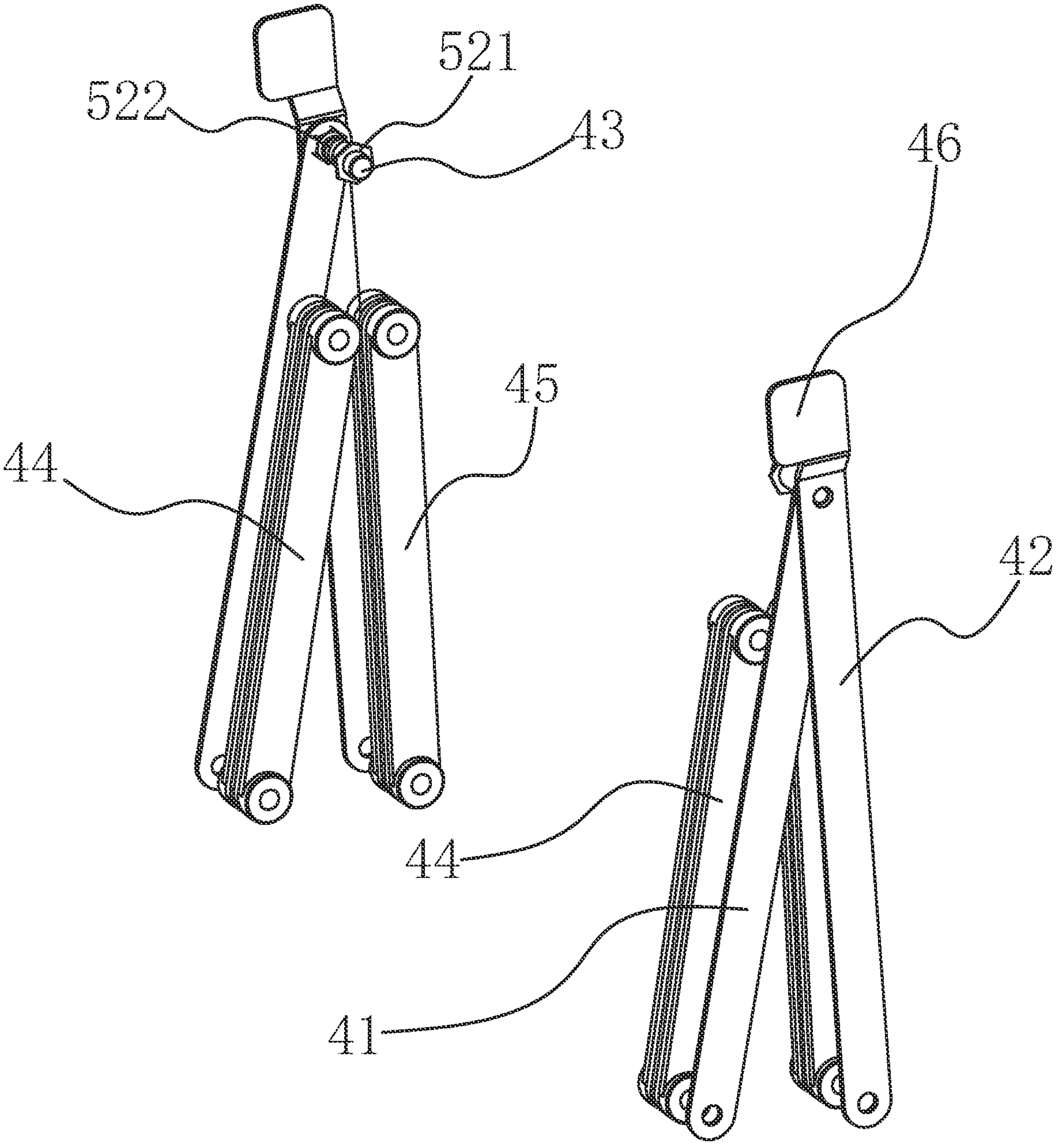
FIG. 4 is a three-dimensional structural diagram of FIG. 3 after a part of structure is hidden.

In the drawings, 1—primary stool; 11—primary supporting plate; 12—primary pedal; 2—secondary stool; 21—secondary supporting plate; 22—secondary pedal; 3—middle plate; 31—chute; 32—yielding slot; 4—linkage mechanism; 41—first connecting rod; 42—second connecting rod; 43—hinge shaft; 431—rotating portion; 44—third connecting rod; 45—fourth connecting rod; 46—hand pulling portion; 5—locking mechanism; 51—positioning hole; 52—elastic structure; 521—positioning ring; 522—spring; 6—anti-skid pad.

DETAILED DESCRIPTION OF THE EMBODIMENTS

Specific embodiments of the present invention are described below, and further description on the technical scheme of the present invention is made below in combination with the drawings. The present invention is not limited to the embodiments.

Example 1

As shown in FIG. 1 to FIG. 4, the two-step step stool provided by the present invention includes a primary stool 1 and a secondary stool 2, wherein the primary stool 1 includes a primary supporting plate 11 and a primary pedal 12 hinged with a top of the primary supporting plate 11; the secondary stool 2 includes a secondary supporting plate 21 and a secondary pedal 22 hinged with a top of the secondary supporting plate 21; the secondary pedal 22 is higher than the primary pedal 12; a middle plate 3 is arranged between the primary stool 1 and the secondary stool 2 and is respectively hinged with the primary pedal 12 and the secondary pedal 22; and a linkage mechanism 4 capable of folding the primary stool and the secondary stool synchronously is further arranged between the primary stool 1 and the secondary stool 2.

A user steps on the primary pedal 12 and the secondary pedal 22, the primary supporting plate 11 and the secondary supporting plate 21 are used for supporting, and the middle plate 3 not only plays a role of supporting, but also plays a role of connecting the primary supporting plate and the secondary supporting plate. The two-step step stool can be folded by hinging the primary supporting plate 11 with the primary pedal 12 and hinging the secondary supporting plate 21 with the secondary pedal 22, and can be drawn close towards the middle plate 3 when being folded by hinging the primary pedal 12 with the middle plate 3 and hinging the secondary pedal 22 with the middle plate 3, so that the occupied area is decreased greatly and it is convenient to convey or move and transfer the two-step step stool. The linkage mechanism 4 is arranged to drive the primary stool 1 and the secondary stool 2 to be folded synchronously, the two-step step stool is easily operated and conveniently used, is high in stability and can be provided with a wider stool surface. The linkage mechanism 4 further can enable the primary stool 1 and the secondary stool 2 to be unfolded synchronously.

The linkage mechanism 4 includes a first connecting rod 41 arranged between the primary supporting plate 11 and the middle plate 3 and a second connecting rod 42 arranged between the secondary supporting plate 21 and the middle plate 3, the first connecting rod 41 and the second connecting rod 42 being linked. The first connecting rod 41 and the second connecting rod 42 are folded with each other to draw close to drive the primary supporting plate 11 and the secondary supporting plate 21 to be folded and drawn close toward the middle plate 3. The primary supporting plate 11 and the secondary supporting plate 21 are drawn close to drive the primary pedal 12 and the secondary pedal 22 to be drawn close till the primary stool 1 and the secondary stool 2 are drawn close. The first connecting rod 41 and the second connecting rod 42 are unfolded to drive the primary supporting plate 11 and the secondary supporting plate 21 to extend and distract. The primary supporting plate 11 and the secondary supporting plate 21 extend to drive the primary pedal 12 and the secondary pedal 22 to extend till the primary stool 1 and the secondary stool 2 extend and distract.

The first connecting rod 41 and the second connecting rod 42 are hinged with each other, and a hinge shaft 43 of the first connecting rod 41 and the second connecting rod 42 is arranged in a chute 31 formed in the middle plate 3. By arranging the hinge shaft 43 in the chute 31, the hinge shaft 43 can slide in the chute 31. A third connecting rod 44 and a fourth connecting rod 45 that are hinged with each other are further arranged between the first connecting rod 41 and the second connecting rod 42, and the third connecting rod 44 and the fourth connecting rod 45 enable the first connecting rod 41 to act so as to synchronously drive the second connecting rod 42 to act.

A bottom of the middle plate 3 is provided with a yielding slot 32 where the third connecting rod 44 and the fourth connecting rod 45 rotate to yield. By forming the yielding slot 32, the third connecting rod 44 and the fourth connecting rod 45 are prevented from interference with the middle plate 3 in the folding or unfolding process.

The first connecting rod 41 or the second connecting rod 42 is provided with a hand pulling portion 46 capable of being pulled by a user. The first connecting rod 41 or the second connecting rod 42 is provided with the hand pulling portion 46 which is conveniently pulled by the user.

A locking mechanism 5 is further arranged between the hinge shaft 43 and the middle plate 3. The two-step step stool in the unfolded state is locked by arranging the locking mechanism 5, so that it can be kept stable. The locking mechanism 5 includes a positioning hole 51 formed in the middle plate 3 and an elastic structure 52 arranged on the hinge shaft 43 to enable the hinge shaft to have a tendency of being jacked into the positioning hole 51 all the time, the hinge shaft 43 passing through the chute 31 and penetrating into the positioning hole 51. The hinge shaft 43 penetrating into the positioning hole 51 can be locked. As the hinge shaft 43 is locked, the first connecting rod 41 and the second connecting rod 42 hinged with the hinge shaft 43 cannot be folded or extend. The elastic structure 52 can prevent the hinge shaft 43 from being separated from the positioning hole 51 accidentally. When it is needed to unlock, the hinge shaft 43 can be pulled manually to overcome an elastic action of the elastic structure 52 to be separated from the positioning hole 51, the hinge shaft 43 can slide in the chute 31, and the first connecting rod 41 and the second connecting rod 42 can be unfolded or folded too as the hinge shaft 43 slides.

The elastic structure 52 includes a positioning ring 521 arranged on the hinge shaft 43 and a spring 522 arranged between the chute 31 and the positioning ring 521, an outer diameter of the spring 522 being greater than a width of the chute 31 and smaller than an outer diameter of the positioning ring 521. The positioning ring 521 cannot only be jacked by the spring 522, but also can prevent the hinge shaft 43 from passing through from the positioning hole 51 or being separated from the chute 31. By arranging the spring 522, an end portion of the hinge shaft 43 can be jacked into the positioning hole 51 all the time.

A bottom of the primary supporting plate 11 and a bottom of the secondary supporting plate 21 are provided with anti-skid pads 6. By arranging the anti-skid pads 6, a friction force between the bottoms of the primary supporting plate 11 and the secondary supporting plate 21 is increased, so that an anti-skid purpose can be achieved.

A working principle of the embodiment is as follows: when the two-step step stool is converted from the folded state into the unfolded state, the primary supporting plate 11 and the secondary supporting plate 21 can be directly pulled outwards, and at the time, the first connecting rod 41, the second connecting rod 42, the third connecting rod 44 and the fourth connecting rod 45 are driven to be unfolded as the primary supporting plate 11 and the secondary supporting plate 21 move. The hinge shaft 43 slides on the chute 31 till it is close to the positioning hole 51. The hand pulling portion 46 is held manually to put the hinge shaft 43 in the positioning hole 51. At the time, the spring 522 jacks the positioning ring 521, and the end portion of the hinge shaft 43 cannot be separated from the positioning hole 51. The two-step step stool can be used by the user when being unfolded completely. When the two-step step stool is converted from the unfolded state into the folded state, the hand pulling portion 46 can be held manually first to be pulled outwards so as to overcome the elastic action of the spring 522 to pull the hinge shaft 43 out of the positioning hole 51. Then, the hand pulling portion 46 is held to slide downwards along the chute 31 or directly push the first supporting plate and the second supporting plate to be folded inwards.

Example 2

Figure 5:
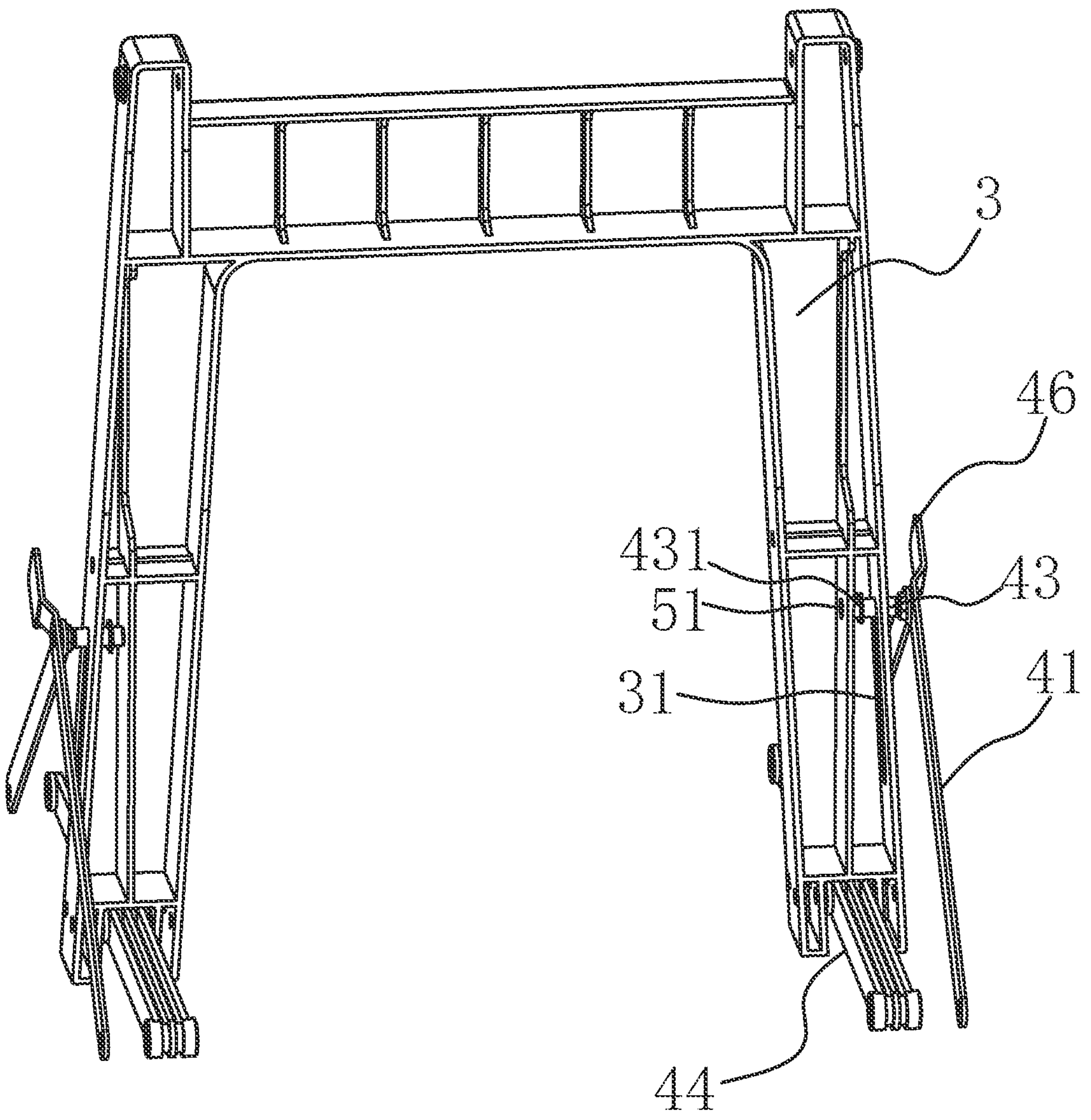
FIG. 5 is a structural schematic diagram of an embodiment 2 of the present invention after a part of structure is hidden.

As shown in FIG. 5, the embodiment is substantially as same as the embodiment 1 in structure. The difference lies in that the locking mechanism 5 includes a positioning hole 51 formed in the middle plate 3 and an internal thread arranged in the positioning hole 51, the hinge shaft 43 is provided with an external thread matched with the internal thread, and the hinge shaft 43 passes through the chute 31 and is in threaded connection with the positioning hole 51. The hinge shaft 43 is further provided with a rotating portion 431 rotated by the user.

The hinge shaft 43 in direct threaded connection with the positioning hole 51 is locked. As the hinge shaft 43 is locked, the connecting rods hinged with the hinge shaft 43 cannot be folded or extend. When it is needed to unlock, the hinge shaft 43 can be rotated to be separated from the positioning hole 51, the hinge shaft 43 can slide in the chute 31, and the connecting rods can be unfolded or folded too as the hinge shaft 43 slides. By arranging the rotating portion 431, it is convenient for the user to unlock by rotating the hinge shaft 43.

The two-step step stool can be folded by hinging the primary supporting plate 11 with the primary pedal 12 and hinging the secondary supporting plate 21 with the secondary pedal 22, and can be drawn close towards the middle plate 3 when being folded by hinging the primary pedal 12 with the middle plate 3 and hinging the secondary pedal 22 with the middle plate 3, so that the occupied area is decreased greatly and it is convenient to convey or move and transfer the two-step step stool. The linkage mechanism 4 is arranged to drive the primary stool 1 and the secondary stool 2 to be unfolded and folded, the two-step step stool is easily operated and conveniently used, is high in stability and can be provided with a wider stool surface. The yielding slot 32 is formed to prevent the first connecting rod 41 and the second connecting rod 42 from interference with the middle plate 3 in the folding or unfolding process. The two-step step stool in the unfolded state is locked by arranging the locking mechanism 5, so that it can be kept stable. The hinge shaft 43 can be prevented from being separated from the positioning hole 51 accidentally by arranging the elastic structure 52 or directly connecting the hinge shaft 43 with the positioning hole 51 by threads directly.

The specific embodiments described herein are merely illustrations of spirit of the present invention. Various modifications or supplements can be made on the described specific embodiments or can be replaced a similar manner by those skilled in the art without deviating from the spirit of the present invention or surpassing the scope defined by the attached claims.

What is claimed is:

1. A two-step step stool, comprising a primary stool and a secondary stool, wherein the primary stool comprises a primary supporting plate and a primary pedal hinged with a top of the primary supporting plate; the secondary stool comprises a secondary supporting plate and a secondary pedal hinged with a top of the secondary supporting plate; the secondary pedal is higher than the primary pedal; a middle plate is arranged between the primary stool and the secondary stool and the middle plate is respectively hinged with the primary pedal and the secondary pedal; and a linkage mechanism configured to fold the primary stool and the secondary stool synchronously is arranged between the primary stool and the secondary stool;

wherein the linkage mechanism comprises a first connecting rod arranged between the primary supporting plate and the middle plate and a second connecting rod arranged between the secondary supporting plate and the middle plate, wherein the first connecting rod and the second connecting rod are linked;

wherein the first connecting rod and the second connecting rod are hinged with each other, and a hinge shaft of the first connecting rod and the second connecting rod is arranged in a chute formed in the middle plate.

2. The two-step step stool according to claim 1, wherein the linkage mechanism is further configured to enable the primary stool and the secondary stool to be unfolded synchronously.

3. The two-step step stool according to claim 2, wherein the linkage mechanism comprises a first connecting rod arranged between the primary supporting plate and the middle plate and a second connecting rod arranged between the secondary supporting plate and the middle plate, wherein the first connecting rod and the second connecting rod are linked.

4. The two-step step stool according to claim 2, wherein a bottom of the primary supporting plate and a bottom of the secondary supporting plate are respectively provided with anti-skid pads.

5. The two-step step stool according to claim 1, wherein a locking mechanism is arranged between a hinge shaft and the middle plate.

6. The two-step step stool according to claim 5, wherein the locking mechanism comprises a positioning hole formed in the middle plate and an elastic structure arranged on the hinge shaft to enable the hinge shaft to have a tendency of being jacked into the positioning hole all the time, wherein the hinge shaft passes through a chute and penetrates into the positioning hole.

7. The two-step step stool according to claim 6, wherein the elastic structure comprises a positioning ring arranged on the hinge shaft and a spring arranged between the chute and the positioning ring, wherein an outer diameter of the spring is greater than a width of the chute and smaller than an outer diameter of the positioning ring.

8. The two-step step stool according to claim 5, wherein the locking mechanism comprises a positioning hole formed in the middle plate and an internal thread arranged in the positioning hole, the hinge shaft is provided with an external thread matched with the internal thread, and the hinge shaft passes through the chute and is in threaded connection with the positioning hole.

9. The two-step step stool according to claim 8, wherein the hinge shaft is provided with a rotating portion rotated by the user.

10. The two-step step stool according to claim 1, wherein a bottom of the primary supporting plate and a bottom of the secondary supporting plate are respectively provided with anti-skid pads.

11. A two-step step stool, comprising a primary stool and a secondary stool, wherein the primary stool comprises a primary supporting plate and a primary pedal hinged with a top of the primary supporting plate; the secondary stool comprises a secondary supporting plate and a secondary pedal hinged with a top of the secondary supporting plate; the secondary pedal is higher than the primary pedal; a middle plate is arranged between the primary stool and the secondary stool and the middle plate is respectively hinged with the primary pedal and the secondary pedal; and a linkage mechanism configured to fold the primary stool and the secondary stool synchronously is arranged between the primary stool and the secondary stool;

wherein the linkage mechanism comprises a first connecting rod arranged between the primary supporting plate and the middle plate and a second connecting rod arranged between the secondary supporting plate and the middle plate, wherein the first connecting rod and the second connecting rod are linked;

wherein a third connecting rod and a fourth connecting rod are arranged between the first connecting rod and the second connecting rod, wherein the third connecting rod and the fourth connecting rod are hinged with each other; and the third connecting rod and the fourth connecting rod enable the first connecting rod to act to synchronously drive the second connecting rod to act.

12. The two-step step stool according to claim 11, wherein a bottom of the middle plate is provided with a yielding slot, wherein the third connecting rod and the fourth connecting rod rotate in the yielding slot to yield.

13. The two-step step stool according to claim 11, wherein the first connecting rod or the second connecting rod is provided with a hand pulling portion configured to be pulled by a user.

* * * * *